US012735191B2

(12) United States Patent
Baig et al.

(10) Patent No.: US 12,735,191 B2
(45) Date of Patent: Sep. 15, 2026

(54) AIRCRAFT HYBRID ELECTRIC PROPULSION AND ATTITUDE CONTROLLER

(71) Applicant: RTX Corporation, Farmington, CT (US)

(72) Inventors: Zubair A. Baig, South Windsor, CT (US); Martin Amari, Glastonbury, CT (US); Ninad Joshi, Brampton (CA)

(73) Assignee: RTX CORPORATION, Farmington, CT (US)

( * ) Notice: Subject to any disclaimer, the term of this patent is extended or adjusted under 35 U.S.C. 154(b) by 153 days.

(21) Appl. No.: 18/341,350

(22) Filed: Jun. 26, 2023

(65) Prior Publication Data

US 2024/0425189 A1 Dec. 26, 2024

(51) Int. Cl.

| | |
|---|---|
| ***B64D 31/12*** | (2006.01) |
| ***B64C 15/02*** | (2006.01) |
| ***B64D 27/16*** | (2006.01) |
| ***B64D 27/33*** | (2024.01) |
| ***B64D 31/18*** | (2024.01) |
| *B64D 27/02* | (2006.01) |

(52) U.S. Cl.
CPC .............. *B64D 31/12* (2013.01); *B64C 15/02* (2013.01); *B64D 27/16* (2013.01); *B64D 27/33* (2024.01); *B64D 31/18* (2024.01); *B64D 27/026* (2024.01)

(58) Field of Classification Search
CPC ........ B64D 31/12; B64D 31/18; B64D 27/33; B64D 27/35; B64D 27/357; G05D 1/10; G05D 1/08; G05D 1/101; G05D 1/49
See application file for complete search history.

(56) References Cited

U.S. PATENT DOCUMENTS

| | | | |
|---|---|---|---|
| 9,376,213 | B2 | 6/2016 | Rolt |
| 9,493,245 | B2 | 11/2016 | Salyer |
| 9,688,414 | B2 | 6/2017 | Burns et al. |

(Continued)

FOREIGN PATENT DOCUMENTS

| | | | |
|---|---|---|---|
| CN | 112947530 | A | 6/2021 |
| CN | 112537453 | B | 4/2022 |

(Continued)

OTHER PUBLICATIONS

Search Report issued in European Patent Application No. 24184722.7; Date of Mailing Mar. 17, 2025 (16 pages).

(Continued)

*Primary Examiner* — Philip J Bonzell
(74) *Attorney, Agent, or Firm* — CANTOR COLBURN LLP

(57) ABSTRACT

An aircraft hybrid electrical propulsion (HEP) propulsion and attitude control system includes a propulsion system, electrical system and HEP controller. The propulsion system includes at least one propulsor and at least one electric motor configured to drive the at least one propulsor to generate to generate one or both of thrust and lift. The electrical system delivers a first amount of power to the at least one electric motor and a second amount of power to a plurality of electrical loads. The HEP controller determines at least one attitude goal of the aircraft, and controls the electrical system to adjust at least one of the thrust or lift to achieve the at least one attitude goal.

10 Claims, 5 Drawing Sheets

(56) References Cited

U.S. PATENT DOCUMENTS

| | | | | |
|---|---|---|---|---|
| 9,759,160 | B2 | 9/2017 | Sankrithi et al. | |
| 10,443,504 | B2 * | 10/2019 | Dalal | F02C 7/268 |
| 10,583,931 | B2 | 3/2020 | Cline et al. | |
| 10,633,104 | B2 | 4/2020 | Miller et al. | |
| 10,696,416 | B2 | 6/2020 | Gansler et al. | |
| 10,759,540 | B2 * | 9/2020 | Long | B64D 27/33 |
| 10,759,545 | B2 | 9/2020 | Schwarz et al. | |
| 10,988,035 | B2 | 4/2021 | Armstrong et al. | |
| 11,143,113 | B2 | 10/2021 | Kopeschka et al. | |
| 11,415,065 | B2 | 8/2022 | Terwilliger et al. | |
| 11,597,526 | B2 | 3/2023 | Mark et al. | |
| 11,866,180 | B2 * | 1/2024 | Long | B64D 27/02 |
| 11,932,387 | B2 * | 3/2024 | Wittmaak, Jr. | G05D 1/102 |
| 2020/0063599 | A1 | 2/2020 | Waun | |
| 2020/0148373 | A1 | 5/2020 | Long | |
| 2020/0347787 | A1 | 11/2020 | Crowley et al. | |
| 2021/0131355 | A1 | 5/2021 | Szarvasy et al. | |
| 2021/0276723 | A1 | 9/2021 | Han | |
| 2021/0347490 | A1 | 11/2021 | Landers et al. | |
| 2022/0350348 | A1 | 11/2022 | Nunes et al. | |
| 2022/0363402 | A1 | 11/2022 | Schenk et al. | |

FOREIGN PATENT DOCUMENTS

| | | | |
|---|---|---|---|
| EP | 3772148 | A1 | 2/2021 |
| EP | 3805107 | A1 | 4/2021 |

OTHER PUBLICATIONS

Partial Search Report issued in European Patent Application No. 24184722.7; Date of Mailing Nov. 29, 2024 (15 pages).

* cited by examiner

AIRCRAFT HYBRID ELECTRIC PROPULSION AND ATTITUDE CONTROLLER

BACKGROUND

Exemplary embodiments of the present disclosure pertain to the art of aircraft propulsion systems, and more particularly to an aircraft hybrid electric propulsion (HEP) system.

Recent advances in electrical motors, energy storage systems, and power electronics converters (PEC) are leading aircraft propulsion to become increasingly electrical. Hybrid-electric propulsion (HEP) systems have been developed, which implement electrical systems in place of one or more traditional aircraft mechanical systems. Fuel and battery sources, for example, may be implemented to allow more possibilities for managing the propulsion system. Currently, aircrafts utilize a contemporary Full Authority Digital Engine Controller (FADEC) to manage effectors and engine thrust to meet various environmental requirements and reduce the fuel consumption of the aircraft.

BRIEF DESCRIPTION

According to a non-limiting embodiment, an aircraft hybrid electrical propulsion (HEP) propulsion and attitude control system includes a propulsion system, electrical system and HEP controller. The propulsion system includes at least one propulsor and at least one electric motor configured to drive the at least one propulsor to generate to generate one or both of thrust and lift. The electrical system delivers a first amount of power to the at least one electric motor and a second amount of power to a plurality of electrical loads. The HEP controller determines at least one attitude goal of the aircraft, and controls the electrical system to adjust at least one of the thrust or lift to achieve the at least one attitude goal.

In addition to one or more of the above disclosed aspects of the system or as an alternate, the at least one propulsor includes a first propulsor and a second propulsor, and wherein the HEP controller is coupled to and configured to control the first propulsor and the second propulsor.

In addition to one or more of the above disclosed aspects of the system or as an alternate, the HEP controller is configured to send a first signal to the first propulsor and a second signal to the second propulsor based on the at least one attitude goal.

In addition to one or more of the above disclosed aspects of the system or as an alternate, the HEP propulsion and attitude control system is implemented as a parallel-hybrid system.

In addition to one or more of the above disclosed aspects of the system or as an alternate, the parallel-hybrid system includes a gas turbine engine and a battery system, and wherein the parallel-hybrid system couples the first and second propulsors to both the gas turbine engine and the battery system.

In addition to one or more of the above disclosed aspects of the system or as an alternate, the HEP propulsion and attitude control system is implemented as a series-hybrid system.

In addition to one or more of the above disclosed aspects of the system or as an alternate, the series-hybrid system includes a gas turbine engine, a battery system and at least one electrical motor, and wherein the series-hybrid system decouples the first and second propulsors from the turbo-generator and is configured to drive the first and second propulsors using the at least one electrical motor.

In addition to one or more of the above disclosed aspects of the system or as an alternate, the series-hybrid system further includes a motor-generator, and wherein one or both of the battery system and the motor-generator are configured to power the at least one electrical motor.

In addition to one or more of the above disclosed aspects of the system or as an alternate, at least one voltage conversion unit in signal communication with the electrical system and the propulsion system, wherein the HEP controller controls the at least one voltage conversion unit to perform one or more voltage conversions to adjust power provided to the propulsors based on the at least one attitude goal.

In addition to one or more of the above disclosed aspects of the system or as an alternate, the at least one attitude goal includes at least one of a target pitch, roll, and yaw input to the aircraft.

According to another non-limiting embodiment, a method of operating a hybrid electrical propulsion (HEP) propulsion and attitude control system included in an aircraft. The method comprises setting thrust and attitude goals of the aircraft, and setting airframe sub-system goals for cooling of the aircraft and power usage of the aircraft. The method further comprises allocating the thrust goals and attitude goals into a first dynamics goal group, allocating airframe sub-system goals into a second dynamic dynamics goal group, and optimizing the goals included in the first dynamics goal group and the goals included in the second dynamics goal group based on at least one Model Predictive Control (MPC). The method further comprises controlling a propulsion system of the aircraft to generate at least one of thrust and lift based on the optimized goals included in the first dynamics goal group and the optimized goals included in the second dynamics goal group to achieve the thrust and attitude goals of the aircraft.

In addition to one or more of the above disclosed aspects of the system or as an alternate, controlling the propulsion system includes controlling a battery system of the aircraft based on the optimized goals included in the first dynamics goal group and the optimized goals included in the second dynamics goal group to control the propulsion system.

In addition to one or more of the above disclosed aspects of the system or as an alternate, the at least one MPC includes: a first MPC configured to determine a first optimal control of the goals included in the first dynamics goal group; and a second MPC different from the first MPC, the second MPC configured to determine a second optimal control of the goals included in the second dynamics goal group.

In addition to one or more of the above disclosed aspects of the system or as an alternate, the propulsion system includes: a first propulsor including a first fan and a first electrical motor in signal communication with the battery system and configured to drive the first fan; and a second propulsor including a second fan and a second electrical motor in signal communication with the battery system and configured to drive the first fan.

In addition to one or more of the above disclosed aspects of the system or as an alternate, the first MPC is configured to output motor speed settings to control at least one of the first and second electrical propulsors; and the second MPC is configured to output electrical power settings configured to control the battery system so as to drive the first and second electrical motors.

In addition to one or more of the above disclosed aspects of the system or as an alternate, controlling the propulsion system includes controlling electrical power output from the battery system to control operation of one or more of the first electrical motor and the second electrical motor so as to adjust one or both of the thrust and the attitude generated by one or both of the first fan and the second fan.

In addition to one or more of the above disclosed aspects of the system or as an alternate, setting thrust and attitude goals includes inputting one or a combination of a target pitch, target roll, and target yaw into the aircraft.

In addition to one or more of the above disclosed aspects of the system or as an alternate, controlling the attitude includes adjusting one or a combination of pitch, roll, and yaw to achieve the one or more target pitch, target roll, and target yaw.

In addition to one or more of the above disclosed aspects of the system or as an alternate, optimizing the goals included in the first dynamics goal group further comprises inputting aircraft feedback information and the thrust and attitude goals into the first MPC algorithm; and inputting the aircraft feedback information and the airframe sub-system goals into the second MPC algorithm.

In addition to one or more of the above disclosed aspects of the system or as an alternate, the method further comprises controlling at least one voltage conversion unit to perform one or more voltage conversions to adjust power provided to at least one propulsor included in the propulsion system based on the at least one attitude goal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Contemporary FADECs are typically limited to managing effectors and engine thrust to meet various environmental requirements and reduce the fuel consumption of the aircraft, but do not manage the battery system and battery power output to control the attitude (e.g., pitch, roll and/or yaw) of the aircraft. Various non-limiting embodiments described herein provide a hybrid electric propulsion (HEP) propulsion and attitude control system, which includes a HEP controller that can also act as a flight controller and/or can assist with performing aircraft maneuvers, such as turns. In one or more non-limiting embodiments, the HEP controller operates as a supervisory controller across multiple motors, so the HEP controller also has control over the aircraft attitude (e.g., pitch, roll, and/or yaw). For example, the HEP controller can use thrust control as attitude control in lieu of or in addition to flight surfaces for control (e.g., could use thrust control if flight control surfaces fail and/or to assist with a maneuver). In another example, the HEP controller can detect an event where the aircraft enters a turn, the HEP controller can increase engine thrust on one side and/or decrease engine thrust on the other side to implement or assist the turn.

According to a non-limiting embodiment, the HEP controller can operate as one control system to distribute engine thrust commands (split 50/50, 60/40, 70/30 depending on flight control computer request). The distribution of thrust and/or power can be uniform or non-uniform across sides of the aircraft (e.g., left side, front, rear, right side, etc.) and/or across propulsors (e.g., uniform thrust produced by all propulsors, increased thrust by select propulsors, etc.). For example, for an aircraft with 10 propulsors (5/5), and one fails, the HEP controller operates the propulsion system to compensate for failure of one propulsor by controlling thrust of the other propulsors (e.g., increase thrust on the side with the failed propulsor, decrease thrust on the side opposite to the failed propulsor).

Figure 1:
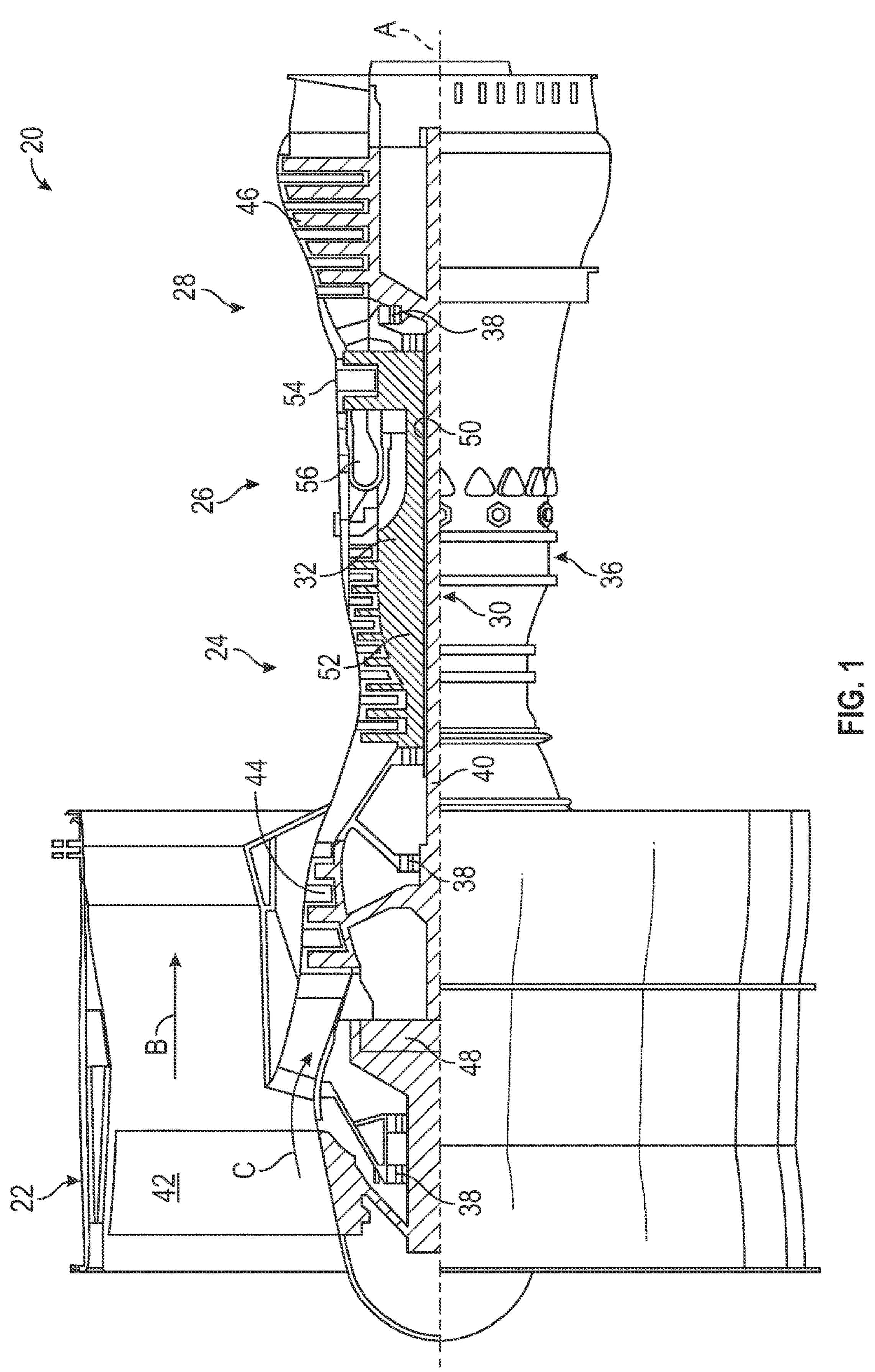
FIG. 1 is a block diagram depicting a gas turbine engine capable of operating with an aircraft hybrid electric propulsion (HEP) system according to a non-limiting embodiment of the present disclosure.

With reference now to FIG. 1, a gas turbine engine 20 is schematically illustrated according to a non-limiting embodiment of the present disclosure. The gas turbine engine 20 is disclosed herein as a two-spool turbofan that generally incorporates a fan section 22, a compressor section 24, a combustor section 26 and a turbine section 28. In one or more non-limiting embodiments, the gas turbine engine 20 is implemented as a turbo-generator or motor-generator such that the gas turbine engine 20 is coupled with an electrically powered motor-generator. In one or more non-limiting embodiments, the turbo-generator is implemented as a gas turbine engine 20 which couples the turbo-generator to a spool (e.g., high speed spool, low speed spool, etc.). In some examples, the turbo-generator may include two or more motor generators, each motor-generator connected to a different spool (e.g., a first motor-generator coupled to a high speed spool and a second motor-generator coupled to a low speed spool.

The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]{circumflex over ( )}0.5. The "Low corrected fan tip speed" as disclosed herein according to one non-limiting embodiment is less than about 1150 ft/second (350.5 m/sec).

Figure 2:
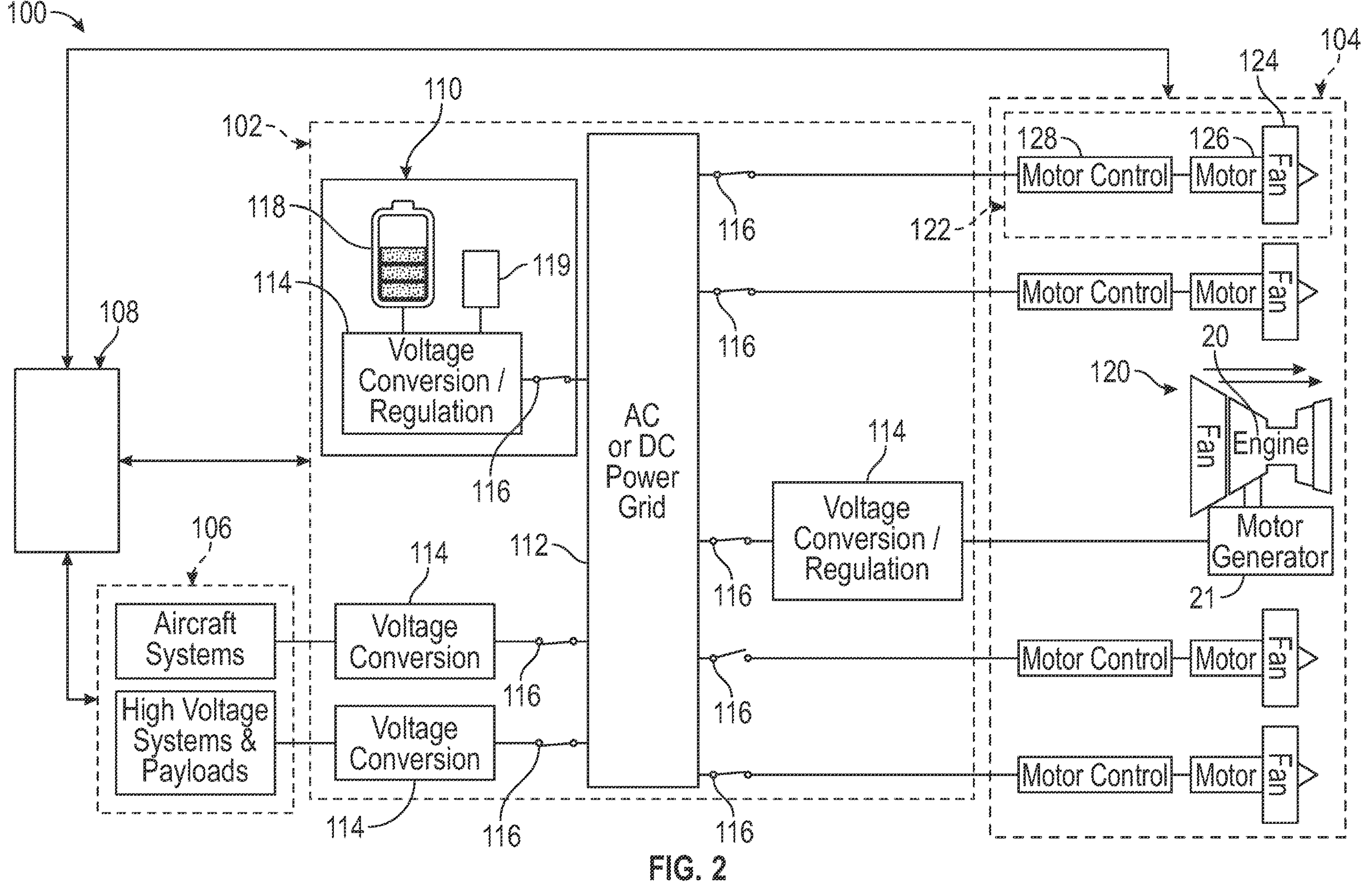
FIG. 2 depicts a HEP propulsion and attitude control system according to a non-limiting embodiment of the present disclosure.

Turning now to FIG. 2, an aircraft hybrid electric propulsion (HEP) propulsion and attitude control system 100 is illustrated according to a non-limiting embodiment of the present disclosure. In this non-limiting embodiment, the HEP propulsion and attitude control system 100 is implemented as a parallel-hybrid system. This parallel-hybrid design architecture allows the HEP propulsion and attitude control system 100 to utilize fuel or electricity to backup one another and/or to provide a supplemental energy source. In one or more non-limiting embodiments, the parallel-hybrid design architecture of 100 couples the propulsors 128 (e.g., propeller/fan 124) to a power management device such as a gear box (not shown) which is fed by the gas turbine engine 20 (e.g., mechanical power source), the electric motor 126 powered by a battery supply source (e.g., electrical power source), or a combination of both the mechanical power source and the electrical power source.

The HEP propulsion and attitude control system 100 can be implemented in various types of aircraft including pilot-operated or autonomous aircrafts (e.g., an unmanned aerial vehicle (UAV)). The HEP propulsion and attitude control system 100 includes a hybrid power system 102, a hybrid propulsion system 104, one or more aircraft sub-systems 106, and a HEP controller 108.

The hybrid power system 102 includes a hybrid energy storage system (HESS) 110, a power grid 112 (also referred to as power bus) and one or more voltage conversion units 114. According to a non-limiting embodiment, the HEP controller 108 can manage the storage of energy, and facilitate voltage conversion by controlling one or more of the voltage conversion units 114 to change the potential of the energy (e.g., steps up voltage or steps down voltage) according to system energy needs. The HEP controller 108 also can control one or more voltage conversion units 114 to facilitate voltage conversions as needed per attitude (pitch, roll, and/or yaw) and/or propulsion commands and goals.

The voltage conversion units 114 can include inverter/power drive circuitry that applies known power control techniques to control the power, current, speed and/or torque. For example, during a snap acceleration, electrical power from the HESS 110 is provided through a voltage conversion unit 114 to drive one or more one or more electrically powered propulsors 122 to produce thrust/lift. In one or more embodiments, the hybrid propulsion system 104 (e.g., the generator) can be used to increase the engine load on the engine shaft, with resulting current passed through a voltage conversion unit 114 for storage in the HESS 110 and/or used elsewhere within the HEP propulsion and attitude control system 100. Accordingly, the propulsors 122 can provide the majority of the lift and/or thrust for the aircraft. In this manner, the active control/routing of the electrical power from the propulsors 122 (e.g., the motors) can be recovered and transferred to electrical systems supporting the initiated mission system(s) and, if necessary, can achieve a slight descent or deceleration can maintain altitude while reducing aircraft speed.

The HESS 110 and the voltage conversion units 114 are electrically connected to the power grid 112 via a respective switch 116. The HEP controller 108 can selectively open and close one or more of the switches 116 to selectively deliver DC power from the HESS 110 to the hybrid propulsion system 104 and/or the aircraft sub-systems 106. The HEP controller 108 can also operate one or more of the switches

116 to selectively deliver AC power (e.g., from a turbo generator) to the HESS 110 and/or the aircraft sub-systems 106. Accordingly, the HEP controller 108 and the power grid 112 can operate together to provide various electric power flow, which can be bi-directionally controlled to shift energy between systems and/or individual components of the HEP propulsion and attitude control system 100 control the propulsors 122 based on flight conditions and attitude goals. The HEP controller 108, for example, can control the hybrid power system 102 (e.g., selection and timing for engaging the various electric power flows) to distribute fuel and power as needed to control the hybrid propulsion system 104 for achieving input aircraft attitude goals as discussed in greater detail below.

The HESS 110 includes one or more energy storage subsystems such as, for example, a battery system 118 and/or a super/ultra-capacitor 119. According to a non-limiting embodiment, the battery system 118 and/or a super/ultra-capacitor 119 can be sized to store energy to support electrical transients for power assistance during a snap acceleration or power shedding during a snap deceleration. Using the battery system 118, for example, for a wide range of acceleration and deceleration conditions can result in oversizing battery capacity with corresponding additional weight carried to meet potential transient demands. The super/ultra-capacitor 119, for example, can provide a lower storage capacity than the battery system 118 but has a higher charge/discharge rate as compared to the battery system 118.

The super/ultra-capacitor 119 can be comprised of one or more electrochemical double layer capacitors (EDLCs) or electrochemical capacitors that have a high energy density when compared to common capacitors, e.g., several orders of magnitude greater than a high-capacity electrolytic capacitor. The super/ultra-capacitor 119 can have higher energy efficiency due to a lower internal resistance than the battery system 118. The super/ultra-capacitor 119 can be operatively coupled to the battery system 118 through a direct current (DC)-to-DC converter, for example. The DC-to-DC converter can convert a voltage level of the battery system 118 to match a voltage level of the super/ultra-capacitor 119 to support charging of the super/ultra-capacitor 119 by the battery system 118. In alternate embodiments, the DC-to-DC converter can be omitted where regulation between the super/ultra-capacitor 119 and the battery system 118 is not needed.

The battery system 118 can also include an isolated battery pack accessible by the HEP controller 108 based on determining a mode of operation of the aircraft. For example, the aircraft mode of operations can include, but are not limited to, a ground-based power mode of operation, a flight power mode, or an emergency power mode of operation. The emergency power mode can use an isolated battery pack to provide power through a DC-to-DC converter to other elements of the HEP system 100, for instance, in place of another power source such as, for example, a ram-air turbine.

The hybrid propulsion system 104 includes a turbo-generator 120 and one or more electrically powered propulsors 122. In one or more non-limiting embodiments, the combination of the propulsors 122 can be utilized at least partially with the gas turbine engine 20 to implement a hybrid propulsion system. The turbo-generator 120 includes a gas turbine engine 20 configured to generate thrust and lift, and a motor-generator 21 configured to generate AC power. The AC power generated by the motor-generator 21 can be delivered to the hybrid power system 102 and converted into a second AC power (e.g., down-converted to a lower AC voltage level) and/or converted into DC power. In one or more non-limiting embodiments, the converted DC power can be delivered to the HESS 110 to recharge the battery included in the battery system 118.

The electrically powered propulsors 122 include a fan 124, a motor 126, and a motor controller 128. The motor controller 128 is in signal communication with the HEP controller 108 and the motor 126. In one or more non-limiting embodiments, the propulsors 122 can include one or more motor sensors configured to output motor data to the HEP controller 108. The motor data can include, but is not limited to, motor speed, motor temperature, power consumption, and/or load demand (e.g., power demand).

The motor controller 128 regulates battery power output to the motor 126, which in turn rotationally drives the fan 124 to generate additional propulsion (e.g., thrust and/or lift). The HEP controller 108 can control the switch 116 to selectively deliver battery power to the motor controller 128, and also control the motor controller 128 to vary the amount of power delivered to motor 126 so as to control the amount of propulsion generated by the fan 124.

As described herein, the HEP controller 108 operates as a supervisory controller across all the propulsors 122 to control the aircraft attitude (e.g., pitch, roll, and/or yaw). For example, the HEP controller 108 can control the thrust generated by one or more of the fans 124 as attitude control in lieu of or in addition to flight surfaces for control. In another example, the HEP controller 108 can detect an event where the aircraft enters a turn, and can increase thrust output from the fans 124 on one side and/or decrease engine thrust from the fans 124 on the other side to implement or assist the turn.

One or more aircraft electrical subsystems 106 are operably coupled to a voltage conversion unit 114 and are in signal communication with the HEP controller 108. The aircraft electrical subsystems 106 can include, but are not limited to, an engine subsystem, an aircraft low-voltage, an aircraft high-voltage subsystem, an aircraft AC subsystem, an aircraft de-icing system, environmental control systems (ECS), and/or other aircraft mission systems (e.g., weather monitoring, communication, air traffic monitoring, etc.). One or more of the subsystems 106 can also include one or more sensors configured to output monitored or sensed data associated with a respective subsystem.

As described herein, the HEP controller 108 is in signal communication with the hybrid power system 102, the hybrid propulsion system 104, and the aircraft sub-systems 106. The HEP controller 108 provides supervisory control that controls operation of the hybrid propulsion system 104 and the aircraft sub-systems 106, while also managing power associated with the hybrid power system 102. As an example, the HEP controller 108 manages multiple propulsion and energy sources of those propulsion needs, engine outputs, targets (N1 targets), power flow from the batteries, and capacitors. The HEP controller 108 also provides real-time optimization across multiple areas of power and thermal systems, and cohesive management across those areas.

The HEP controller 108 includes a memory system (not shown) to store instructions that are executed by a processing system. The executable instructions may be stored or organized in any manner and at any level of abstraction, such as in connection with a controlling and/or monitoring operation of the hybrid power system 102, the hybrid propulsion system 104, and/or the aircraft sub-systems 106. The processing system can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 192 may include random access memory (RAM), read only memory (ROM), or other electronic, optical, magnetic, or any other computer readable medium onto which is stored data and control algorithms in a non-transitory form.

The HEP controller 108 can actively manage power transfer from or to the hybrid power system 102, the hybrid propulsion system 104, and/or the aircraft sub-systems 106. The HEP controller 108 can also monitor a state of charge of the HESS 110 along with various power requests from one or more of the aircraft systems such as, for example, the aircraft/engine subsystems control 106, the motor controllers 128, the motor-generator 21 (e.g., generator controller), and/or the aircraft sub-systems 106. The HEP controller 108 can also interface with and control multiple elements of the HEP propulsion and attitude control system 100, such as switches, current sensors, voltage sensors, temperature sensors, communication buses, and the like.

In one or more non-limiting embodiments, the HEP controller 108 can be implemented as a predictive controller or other model-based controller which can use a multi-variable model-based control scheme to control the hybrid power system 102, the hybrid propulsion system 104, and/or the aircraft sub-systems 106. Models of the hybrid power system 102, the hybrid propulsion system 104, and/or the aircraft sub-systems 106 can be created, and dynamically updated as the modeled components and/or systems evolve over time (e.g., degrade over life, match flight conditions, etc.). The models can target a most efficient operation (e.g., optimal time to charge/discharge, etc.) of the system (e.g., at flight cruising conditions and engine at peak efficiency).

For example, a model of one or more components included in the hybrid power system 102, the hybrid propulsion system 104, and/or the aircraft sub-systems 106 can be created, and dynamically updated as the modeled components and/or systems operate over time (e.g., degrade over life, match flight conditions, etc.). The models can target a most efficient operation (e.g., optimal time to charge/discharge, etc.) of the system (e.g., at flight cruising conditions and engine at peak efficiency).

Figure 3:
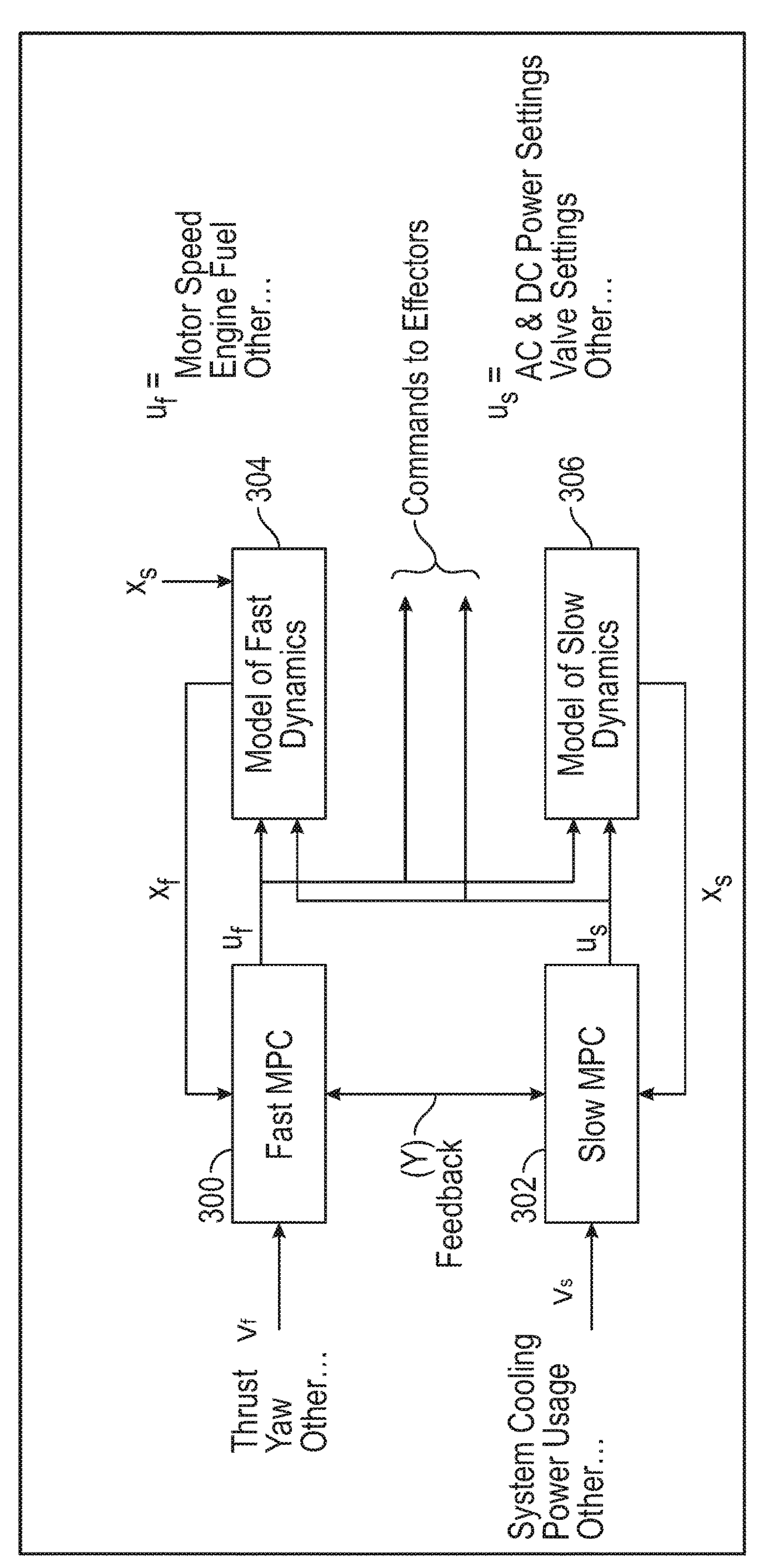
FIG. 3 depicts a HEP controller included in an HEP propulsion and attitude control system according to a non-limiting embodiment of the present disclosure.

Turning to FIG. 3, a HEP controller 108 included in the HEP propulsion and attitude control system 100 is depicted according to a non-limiting embodiment of the present disclosure. The HEP controller 108 employs a fast model predictive control (MPC) algorithm 300, a slow MPC algorithm 302, a fast aircraft dynamics model 304, and a slow aircraft dynamics model 306. The HEP controller 108 allocates the fast-changing dynamic goals ($V_f$) into a first goal group and slow-changing dynamic goals ($V_s$) into a second goal group. The fast-changing dynamic goals ($V_f$) include aircraft attitude goals such as, for example, thrust, pitch, roll, yaw, etc., (e.g., input to the aircraft either autonomously and/or manually by a pilot). The slow-changing dynamic goals ($V_s$) include airframe sub-system goals such as, for example, system cooling data, power usage, etc.

The fast MPC algorithm 300 inputs the fast-changing dynamic goals ($V_f$) along with various aircraft feedback information (Y), and outputs aircraft response data ($U_f$). The aircraft feedback information (Y) includes, for example, sensed values of the effectors being controlled (e.g., motor speed feedback, actuator position), along with Mach number, ambient pressure and temperature. The aircraft response data ($U_f$) includes, for example, motor speed, engine fuel, etc. The slow MPC algorithm 302 inputs the slow-changing goals ($V_s$) along with the aircraft feedback information (Y) and outputs system settings data ($U_s$) such as, for example, power settings, valve settings, etc. Accordingly, the aircraft response data ($U_f$) (e.g., fuel) and the system settings data ($U_s$) (e.g., power) can be output to corresponding effectors to achieve a set goal.

The slow aircraft dynamics model 306 models various airframe subsystems such as the hybrid power system 102 and/or the aircraft sub-systems 106. The slow aircraft dynamics model 306 inputs the system settings data ($U_s$) and the aircraft response data ($U_f$), and outputs airframe setting controls ($X_s$) which are fed back to the slow MPC algorithm 302 to optimize control of the airframe sub-systems. Similarly, the fast aircraft dynamics model 304 models various fast-changing controls of the aircraft such as attitude controls (e.g., thrust, pitch, roll and/or yaw). The fast aircraft dynamics model 304 inputs the aircraft response data ($U_f$) and the airframe setting controls ($X_s$), and outputs attitude control data ($X_f$) that is fed back to the fast MPC algorithm 300 to optimize attitude controls (thrust, pitch, roll, yaw, etc.) of the aircraft. Accordingly, the HEP controller 108 can control the hybrid power system 102 and/or hybrid propulsion system 104 to divert thrust from a propulsor 122 to another propulsor 122 to assist or strengthen the input attitude goal while balancing power associated with the motor-generator 21 and HESS 110.

Figure 4:
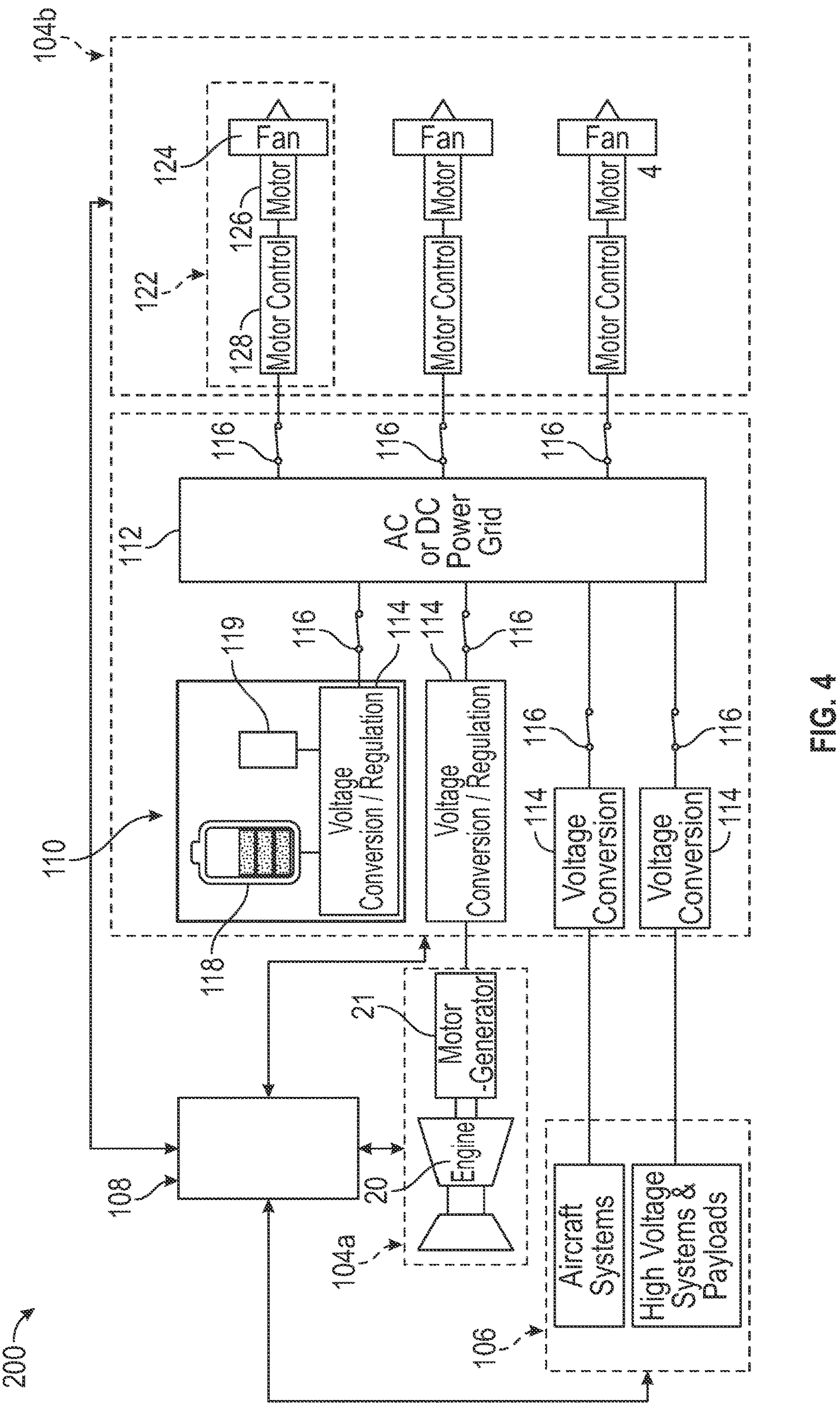
FIG. 4 depicts another HEP propulsion and attitude control system according to a non-limiting embodiment of the present disclosure.

FIG. 4 depicts a HEP propulsion and attitude control system 200 according to another non-limiting embodiment of the present disclosure. In this example, the HEP propulsion and attitude control system 200 is implemented as a series hybrid system. In this non-limiting embodiment, the electrically powered propulsors 122 are "decoupled" from the turbo-generator 120. Accordingly, the system 200 can be operated in a mode where the propulsors 128 (e.g., propeller/fan 128) are always driven by their corresponding electrical motor 128 and power to drive the electrical motors 128 is supplied by the HESS 110 or electrically fed by the motor-generator 21. Compared to the parallel-architecture design of the HEP propulsion and attitude control system 100 shown in FIG. 2, the series-architecture design of the HEP propulsion control system 200 allows it to fit in a smaller packages due to the remote location or "decoupling" arrangement of the electrically powered propulsors 122 from the turbo-generator 120. In addition, the series-architecture design of the HEP propulsion control system 200 allows for greater variability in the shape of the airframe as small motor/fans can be placed at any location targeted by the designer.

Figure 5:
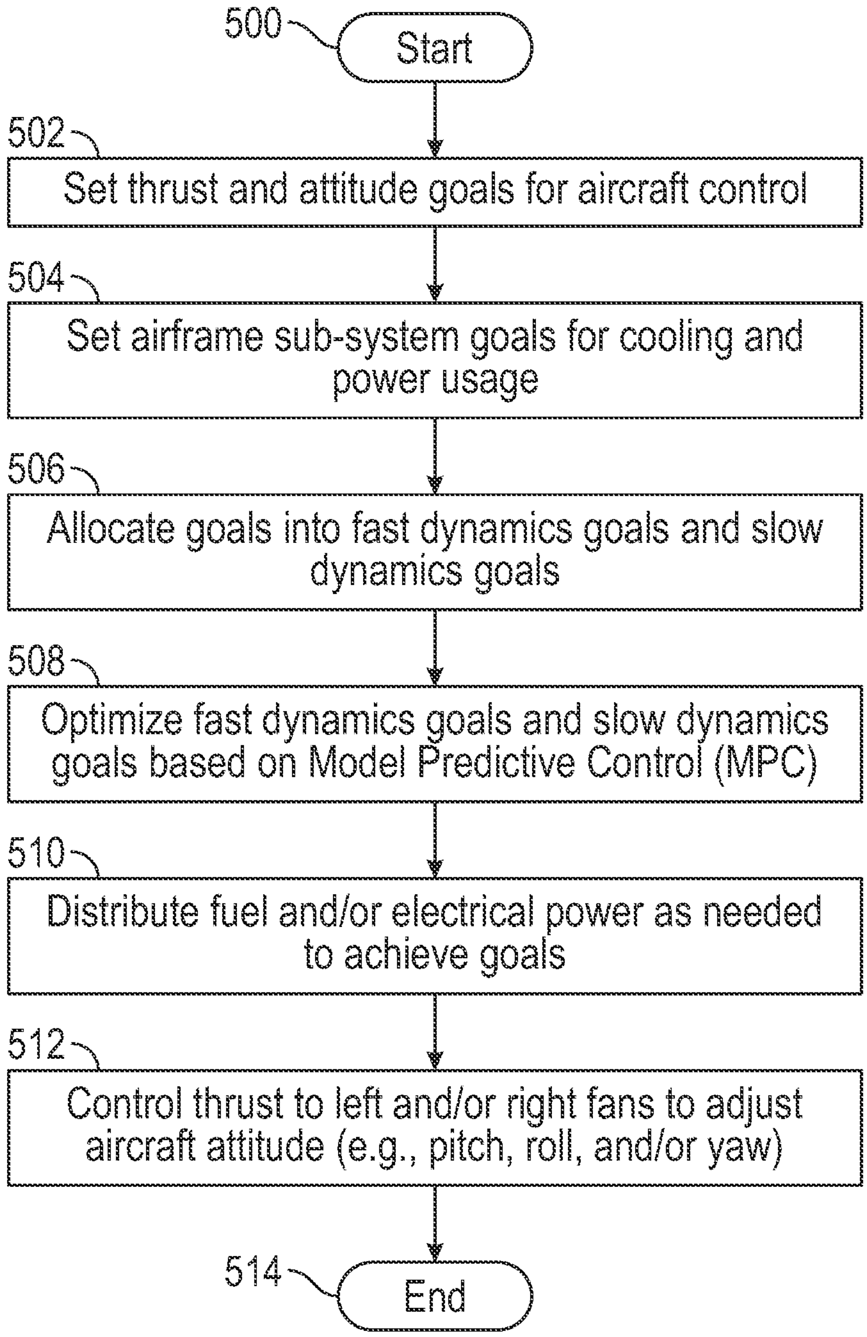
FIG. 5 is a process for actively performing motor and electrical load management in a HEP propulsion and attitude control system of an aircraft according to a non-limiting embodiment.

Turning now to FIG. 5 a method for actively performing motor and electrical load management in a HEP propulsion and attitude control system of an aircraft is illustrated according to a non-limiting embodiment. The method begins at operation 500, and at operation 502 thrust and attitude goals for the aircraft are set (e.g., manually by a pilot, determined by control system for unmanned aircraft, etc.). At operation 504, airframe sub-system goals are set, e.g., for cooling and power usage. At operation 506, the thrust and attitude goals are grouped into a fast dynamics goal group (i.e., a first dynamics goal group) and the airframe sub-system goals are grouped into a slow dynamics goal group (i.e., a second dynamics goal group). At operation 508, the goals of the fast dynamics group are optimized using a fast MPC and fast dynamics model, while the goals of the slow dynamics group are optimized using a slow MPC and slow dynamics model. According to a non-limiting embodiment, the first MPC is configured to output motor speed settings which can control one or more of the electrical propulsors, and the second MPC is configured to output electrical power settings which can control the HESS (e.g., battery system) and the output power used to drive the electrical motors. Accordingly, the motor speed settings can be output to the fast dynamics model so as to optimize the motor speed settings of the propulsors, while the electrical power settings can be output to the slow dynamics model so as to optimize the electrical power settings of the HESS.

At operation 510, attitude controls are generated (e.g., fuel and/or electrical power are distributed) to achieve the attitude and airframe sub-system goals, respectively. At operation 512, thrust output of left and/or right propulsors (e.g., fans) is controlled or adjusted to assist or strengthen aircraft attitude (e.g., pitch, roll, yaw, etc.), and the method ends at operation 514. Though described as having left and/or right propulsors, this is not intended to be so limiting, and additional/alternative configurations of propulsors left, right, front, rear, etc. are contemplated herein.

As described herein, one or more non-limiting embodiments of the present disclosure provide an HEP system can perform load management and energy management associated with different electrical loads on the aircraft, and can operate as an integrated motor/load management system which enables different power exchange modes to actively control thrust of a hybrid propulsor in response to changes in electrical loads applied to the electrical systems. In this manner, the HEP system can provide balanced power loading between the hybrid propulsion system and remaining AC electrical systems throughout the duration of the flight.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A hybrid electrical propulsion (HEP) propulsion and attitude control system included in an aircraft, the HEP propulsion and attitude control system comprising:

a propulsion system configured to generate at least one of thrust or lift for operation of the aircraft, the propulsion system comprising at least one propulsor and at least one electric motor configured to drive the at least one propulsor;

an electrical system configured to deliver a first amount of power to the at least one electric motor and a second amount of power to a plurality of electrical loads; and a HEP controller in signal communication with the electrical system and the propulsion system, the HEP controller configured to determine at least one attitude goal of the aircraft, and control the electrical system to adjust at least one of the thrust or lift to achieve the at least one attitude goal, wherein controlling the electrical system includes:

generating first changing dynamic goal data (Vf) based on the at least one attitude goal and second changing dynamic goal data (Vs) based on at least one airframe sub-system goal;

inputting the first changing dynamic goal data (Vf) into a first Model Predictive Control (MPC) algorithm and inputting the second changing dynamic goal data (Vs) into a second Model Predictive Control (MPC) algorithm different from the first MPC algorithm;

outputting aircraft response data (Uf) from the first MPC algorithm and outputting system settings data (Us) from the second MPC algorithm;

inputting the aircraft response data (Uf) into and the system settings data (Us) into each of a first aircraft dynamics model and a second aircraft dynamics model different from the first aircraft dynamics model;

outputting airframe setting controls (Xs) from the first aircraft dynamics model which are fed back to the second MPC algorithm to optimize control airframe sub-systems of the aircraft, and outputting attitude control data (Xf) which is fed back to the first MPC algorithm to optimize attitude controls of the aircraft; and controlling the at least one electric motor based on the aircraft response data (Uf) to divert thrust from at least one propulsor so as to adjust the at least one of the thrust or lift and achieve the at least one attitude goal while balancing the first amount of power associated with the at least one electric motor.

2. The HEP propulsion and attitude control system of claim 1, further comprising at least one voltage conversion unit in signal communication with the electrical system and the propulsion system, wherein the HEP controller controls the at least one voltage conversion unit to perform one or more voltage conversions to adjust power provided to the propulsors based on the at least one attitude goal.

3. The HEP propulsion and attitude control system of claim 1, wherein the at least one attitude goal includes at least one of a target pitch, roll, and yaw input to the aircraft.

4. The HEP propulsion and attitude control system of claim 1, wherein the at least one propulsor includes a first propulsor and a second propulsor, and wherein the HEP controller is coupled to and configured to control the first propulsor and the second propulsor.

5. The HEP propulsion and attitude control system of claim 4, wherein the HEP controller is configured to send a first signal to the first propulsor and a second signal to the second propulsor based on the at least one attitude goal.

6. The HEP propulsion and attitude control system of claim 5, wherein the HEP propulsion and attitude control system is implemented as a parallel-hybrid system.

7. The HEP propulsion and attitude control system of claim 6, wherein the parallel-hybrid system includes a gas turbine engine and a battery system, and wherein the parallel-hybrid system couples the first and second propulsors to both the gas turbine engine and the battery system.

8. The HEP propulsion and attitude control system of claim 5, wherein the HEP propulsion and attitude control system is implemented as a series-hybrid system.

9. The HEP propulsion and attitude control system of claim 8, wherein the series-hybrid system includes a gas turbine engine, a battery system and at least one electrical motor, and wherein the series-hybrid system decouples the first and second propulsors from a turbo-generator and is configured to drive the first and second propulsors using the at least one electrical motor.

10. The HEP propulsion and attitude control system of claim 9, wherein the series-hybrid system further includes a motor-generator, and wherein one or both of the battery system and the motor-generator are configured to power the at least one electrical motor.

* * * * *